J. E. SWEET.
STEAM SEPARATOR.
APPLICATION FILED DEC. 27, 1910.

988,406.

Patented Apr. 4, 1911.

Witnesses:

Inventor:
John E. Sweet
By Heaward P. Denison
Attorney.

UNITED STATES PATENT OFFICE.

JOHN E. SWEET, OF SYRACUSE, NEW YORK, ASSIGNOR TO THE DIRECT SEPARATOR COMPANY, OF SYRACUSE, NEW YORK, A CORPORATION OF NEW YORK.

STEAM-SEPARATOR.

988,406.  Specification of Letters Patent.  Patented Apr. 4, 1911.

Application filed December 27, 1910. Serial No. 599,247.

*To all whom it may concern:*

Be it known that I, JOHN E. SWEET, of Syracuse, in the county of Onondaga, in the State of New York, have invented new and useful Improvements in Steam-Separators, of which the following, taken in connection with the accompanying drawings, is a full, clear, and exact description.

This invention relates to certain improvements in steam separators adapted to be connected to the exhaust ports of steam engines, steam pumps and other apparatus in which a greater or less quantity of oil used for lubricating purposes is brought into direct contact with the steam and is thereby held in suspension and carried out through the exhaust port. This exhaust steam is frequently utilized for heating, drying and other purposes and if sufficiently pure may be condensed and used as a water supply for various uses such as ice plants, cooling towers and the like and unless the oil is separated from the steam, the heating or other pipes through which the exhaust steam is passed become coated on the interior with oil or a composition of foreign matter, thereby not only insulating the heat of the steam from the pipes and preventing effective radiation but also causes more or less of the foreign matter and oil to be carried off with the steam either to the atmosphere or to the apparatus with which the exhaust may be connected.

The main object, therefore, of my present invention is to obviate these objectionable results by separating the oil and other foreign matter from the steam immediately upon or soon after its exit from the exhaust port and at the same time to remove as far as practicable any excess water of condensation which may escape through the exhaust port, thereby leaving the steam practically pure to be utilized for any purpose desired.

Other objects and uses relating to the specific parts of the separator will be brought out in the following description.

Figure 1:
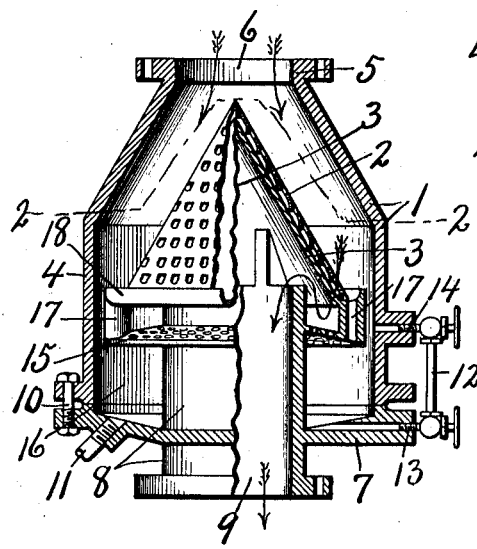
Figure 3:
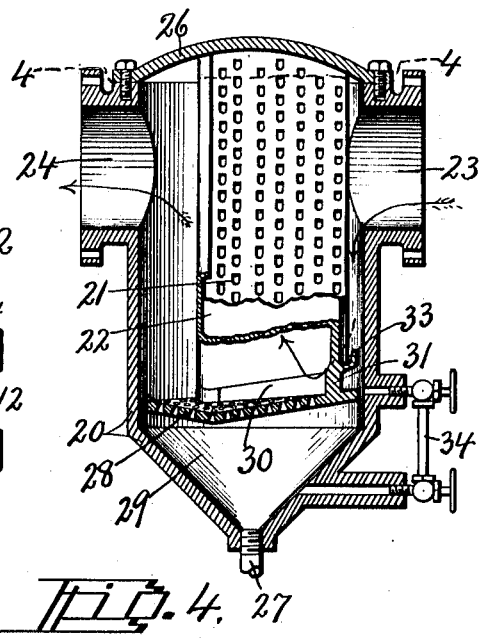
Figure 2:
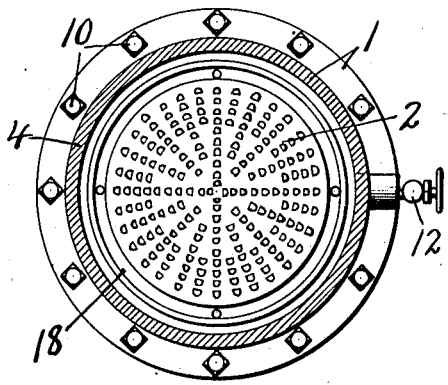
Figure 4:
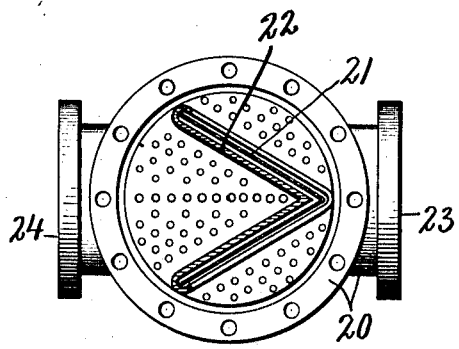

In the drawings, Figure 1 is a lengthwise sectional view of one form of my improved separator showing a conical baffle plate and exit tube, partly in elevation. Fig. 2 is a transverse sectional view taken on line 2—2, Fig. 1. Fig. 3 is a lengthwise sectional view of another form of separator showing an angular baffle plate having its sides converging toward the inlet. Fig. 4 is a transverse sectional view through the device shown in Fig. 3 taken on line 4—4.

In each of the forms of separator shown, a flaring screen preferably of perforated sheet metal is placed within a suitable case between the inlet and outlet thereof with its apex or angle facing the inlet in close proximity thereto and substantially coincident with the axis thereof so that the inflowing oil-laden steam will be split or divided and impinged directly against the flaring sides of the screen, thereby causing the more inert oil and water of condensation to adhere to and gravitate downwardly along said screen into a suitable trough provided therefor, the pure steam being deflected from a direct course from the inlet to the outlet so as to allow any additional water of condensation to gravitate upon and through a perforated bottom with which the apparatus is provided.

The apparatus shown in Figs. —1— and —2— comprises an outer case or shell —1— and an inner conical screen —2— which incloses a similarly formed baffle cone —3—. The case —1— may be made of cast metal or any other suitable material and preferably comprises a cylindrical main body —4— having, in this instance, a reduced upper end —5— provided with an inlet —6—. The opposite or lower end of the shell or casing —1— is closed by a suitable cap or head —7— also of cast metal or other suitable material and provided with a central tube —8— of considerably smaller diameter than that of the interior of the shell into which it projects and is formed with a central lengthwise outlet passage —9— for the exit of the steam. The head —7— and tubular outlet —8— are preferably formed integral, the head being secured to the adjacent end of the casing —1— by suitable fastening means as bolts —10— and is provided with a drainage outlet —11— at one side of the tube —8— for permitting the passage of oil and water of condensation which may accumulate in the bottom of the casing around the tubular extension —8—. A suitable sight gage —12— is connected at points one above the other to the interior of the case by pipes —13— and —14— to indicate the level of such water or oil and also serving to indicate the amount of oil which may float upon the water.

The upper inner end of the tube —8— is provided with an integral frusto-conical perforated flange or plate —15— in a plane a short distance from the upper end of the tube and a greater distance above the head —7— for the purpose of permitting any water of condensation which cannot be held in suspension by the steam, to pass therethrough and into the underlying chamber as —16— while the steam is passing around the lower enlarged end of the conical screen —2— in its passage from the inlet into the inner end of the tube —8—. This perforated flange —15— is provided near its outer edge with a plurality of integral upwardly projecting tubular conduits —17— preferably spaced uniform distances apart circumferentially and communicating with a horizontal circular trough —18— which is secured to and preferably integral with the upper ends of the tubular conduits —17— whereby said trough is supported in a plane some distance above that of the flange —15— but in a plane below that of the upper end of the tube —8—.

The base of the baffle cone —3— and also the circular trough —18— are of somewhat greater diameter than but concentric with the upper end of the tube —8—, thereby leaving a clear open space between the upper end of the tube and base of the cone and also between the perforated flange —15— and trough —18— between the tubular conduits —17— for the passage of steam around and under the lower edge of the baffle cone, thence upwardly and downwardly into the upper end of the tube —8—.

The conical screen —2— is seated upon and around and is substantially coextensive with the conical baffle —3—, said screen being usually made of sheet metal having its apertures formed by stamping or punching portions of the metal inwardly leaving such portions united to the main body to serve as deflectors and thereby form a series of small pockets in which the oil and water of condensation may collect and then trickle down along the baffle cone or screen into the underlying trough —18— from which it is conducted through the tubular conduits —17— into the underlying chamber —16— and may be drawn off when necessary through the drain conduit —11—.

The conical members —2— and —3— and tubular outlet —8— and also the trough —18— and perforated flange —15— are, in this instance, substantially concentric with the axis of the shell of casing —1—.

The sides of the conical members converge toward the inlet while the apex or angle of the converging sides is disposed in close proximity to such inlet leaving a considerable space between the screen and outer shell or casing for the free passage of the steam without liability of producing excessive back pressure upon the engine or pump.

By extending the inner ends of the tube —8— into and a short distance above the lower larger end of the conical members —2— and —3—, the steam entering the shell —1— is caused to return upwardly after passing downwardly and under the lower end of the cone before it enters the upper end of the tube —8— for final discharge from the separator.

The oil-laden exhaust steam entering the inlet —6— impinges directly against and is divided or split up by the conical screen —2—, thereby causing the perforations of small pockets formed therein to collect and separate the more inert particles of oil and water of condensation which are caused to gravitate along the flaring sides of the cone members —2— and —3— into the underlying trough —18— and thence through the conduits —17— into the underlying chamber —16—, while the pure steam continues to travel downwardly around the lower edge of the trough and thence upwardly around the upper edge of and into the discharge tube —8— and may be used for any purpose desired. As the steam returns around the lower edge of the conical members —2— and —3— and trough —18—, any excess water of condensation beyond what may be held in suspension by the steam, gravitates onto the underlying perforated plate or flange —15— and through the perforations thereof into the underlying chamber —16—, thus assuring a more perfect separation of the oil and excess water from the steam and allowing the latter to pass outwardly through the discharge tube —8— in a practically pure state.

It will be observed that the cone members —2— and —3—, discharge tube —8— and perforated flange —15— are all carried by the head —7— and may therefore be removed from or reinserted into the casing with the head.

In Figs. 3 and 4 I have shown a modified form of separator comprising an outer shell or casing —20— and a flaring screen —21— which is mounted upon a similarly flaring baffle —22—. This separator is adapted to be connected to horizontal pipes and for this purpose its main body is substantially cylindrical and provided near its upper end with an inlet —23— and an outlet —24—, the upper end being closed by a suitable cap —26— while the lower end is preferably tapering or reduced and provided with a drip pipe —27—. The flaring screen —21— and its supporting baffle —22— are preferably secured to the head —26— and extend downwardly across and some distance below the inner ends of the inlet —23— and outlet —24—. Secured to and preferably integral with the lower end of the baffle —22— is a perforated bottom plate or flange —28— of slightly less diameter than the inner diameter of the casing to permit the oil and water of condensation to pass therethrough into an underlying chamber —29— in the bottom of the case or shell —20—. The lower ends of the sides of the flaring members —21— and —22— terminate a short distance above the upper face of the perforated plate —28— thus forming intervening passages —30— to permit the steam to pass under the lower edges of said sides and to return upwardly to the outlet —24—, the perforated plate —28— being united to the inner baffle —22— by comparatively narrow studs or tie pieces —31—. The sides of the flaring members —21— and —22— are substantially flat and disposed at an angle to each other so as to converge toward the inlet with the apex in close proximity thereto and substantially coincident with the axis thereof so that the inflowing steam will be divided or split up and impinged directly against the flaring sides of the perforated screen. This screen is preferably made of metal perforated by stamping out portions thereof leaving a series of tongues united to the main body and forming a plurality of small pockets for the collection of oil and water of condensation which by reason of their greater inertia are separated from the steam and trickle or gravitate downwardly along the plates —21— and —22— and into an underlying trough —33— substantially coextensive and parallel with the lower edges of the members —21— and —22—. The opposite sides of this trough are preferably inclined from the apex or angle of the screen toward the opposite edges thereof so as to allow the oil or water to readily gravitate along said troughs and onto the underlying perforated plate —28— and thence into the underlying chamber —29—. A sight gage —34— similar to the gage -12— is connected by suitable pipes one above the other to the interior of the chamber —29— to indicate the amount of oil or water which may be collected therein.

The oil-laden steam entering the inlet —23— impinges directly against the flaring sides of the screen —21— which serves to divide or split up and distribute such steam over a large area, thus leaving the more inert particles or oil and water of condensation in the pockets formed by the perforations of such screen and allowing such particles to gravitate along the screen and back plate or baffle —22— into the underlying trough —33—, the pure steam passing downwardly under the lower edges of the members —21— and —22— and trough —33— and thence upwardly and outwardly through the outlet —24—, the excess of water of condensation which cannot be held in suspension by the steam being liberated at the return of the steam around the lower edges of the members —21— and —22— and is deposited upon the perforated plate —28— and then into the chamber —29—.

In both forms of my invention it will be observed that the steam is caused to pass downwardly and then upwardly in transit from the inlet to the outlet which is one of the important features of my invention taken in connection with the interposition of a flaring baffle between said inlet and outlet.

What I claim is:

A steam separator comprising an outer shell or casing having an inlet and an outlet, a flaring screen interposed between the inlet and outlet and having its smaller side facing the inlet, said screen having one end terminating in a plane below the inlet and below the inner end of the outlet whereby the steam is caused to pass downwardly and then upwardly in transit from the inlet to said outlet.

In witness whereof I have hereunto set my hand on this 16th day of December 1910.

JOHN E. SWEET.

Witnesses:
W. H. THOMAS,
H. T. SMITH.